Patented Dec. 27, 1938

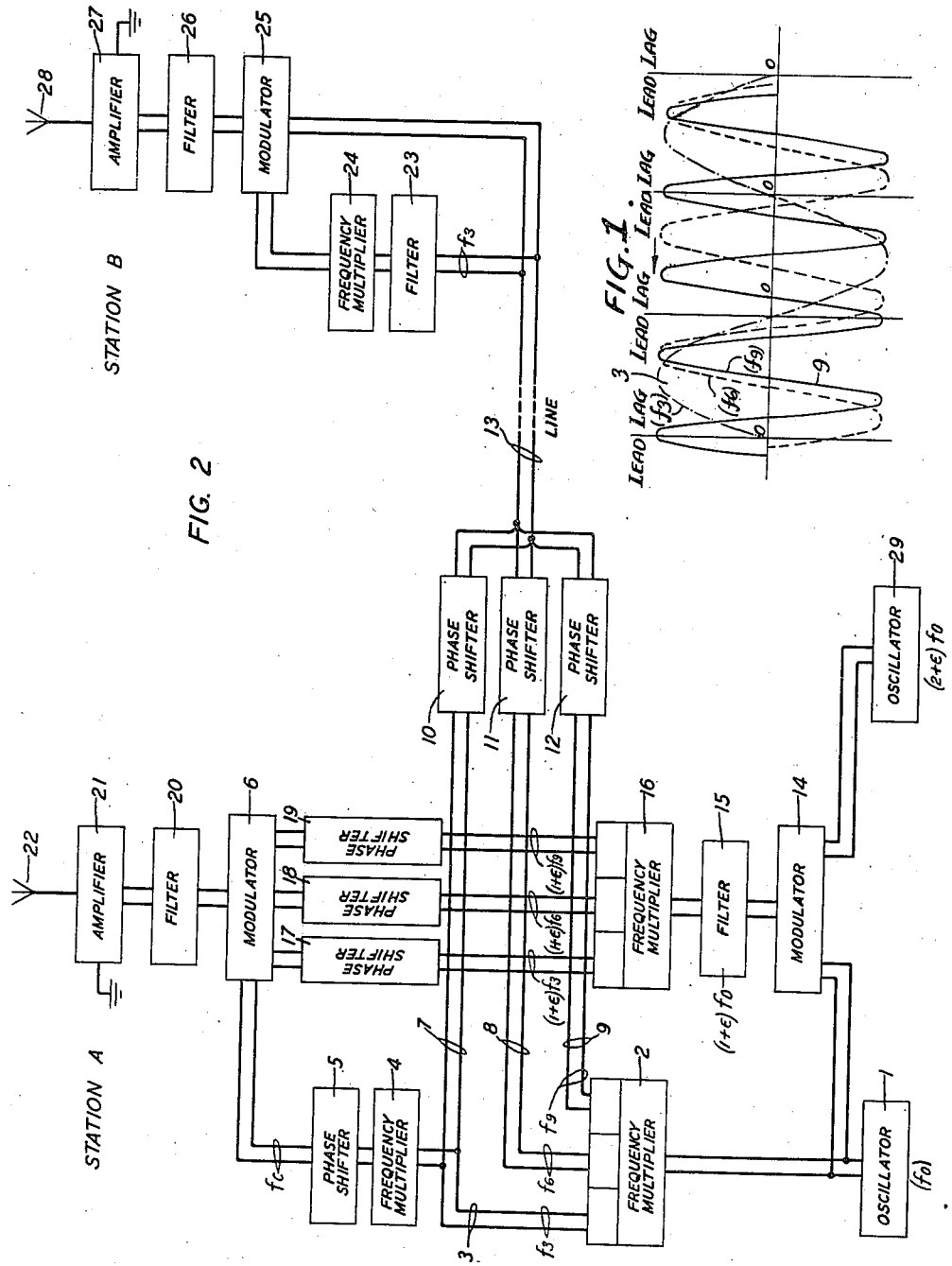

2,141,282

UNITED STATES PATENT OFFICE 2,141,282

WAVE TRANSMISSION

George Clark Southworth, Red Bank, N. J., and French Hoke Willis, New York, N. Y., assignors to American Telephone & Telegraph Company, a corporation of New York Application July 22, 1936, Serial No. 91,972

7 Claims. (Cl. 250—2)

This invention relates to radio transmission and particularly to means for and to methods of setting up fields of energy in space for the control of moving objects, such as aircraft.

The object of the invention is to establish in space a moving field of energy and to utilize this field for the purpose of controlling the velocity of a moving body.

Systems have been proposed heretofore for guiding an airplane automatically along a given course or toward a given destination point by means of radio waves received by receiving equipment carried on the airplane. Radio waves have also been utilized to operate mechanism on an airplane to give an indication of the distances traversed by the craft along its course. And it is to methods and systems of this general character, in which radio waves are used as an aid to the navigation of moving craft, that the present relates.

In accordance with the object stated above the present invention has as one of its features a method of controlling moving craft in which radio waves, whose frequencies differ by a relatively small amount, are transmitted from each of two separated stations, the transmission from each station being directed toward the other station. The two waves, being transmitted in opposition, establish a field of interference in space, and, since the frequencies differ from each other, the resultant is a wave that moves at a relatively low speed or creeps from one station toward the other, the speed depending on the amount by which the frequencies differ. The velocity at which this creeping wave moves is chosen at the desired speed of flight of the airplane, and the wave is employed as a means of automatically controlling the speed of the craft. If the craft gains or loses speed relative to the wave, the intensity of the received signal varies accordingly, and this causes a corresponding adjustment in the speed of the craft.

Another feature is a method in which a system of creeping waves, comprising a plurality of creeping waves, each bearing a definite frequency relation to the others, is established in space, and in which the relation of the speed of the craft to the speed of each of the component waves of the system is used to effect the desired regulation of the engine throttle or other speed controlling device.

These and other features of the invention will be discussed more fully in the following detailed specification.

In the drawings:

Figure 1 is a diagram illustrating a wave system;

Fig. 2 is a diagram illustrating the equipment at each of two separated transmitting stations together with a physical transmission line between said stations.

Figure 3:
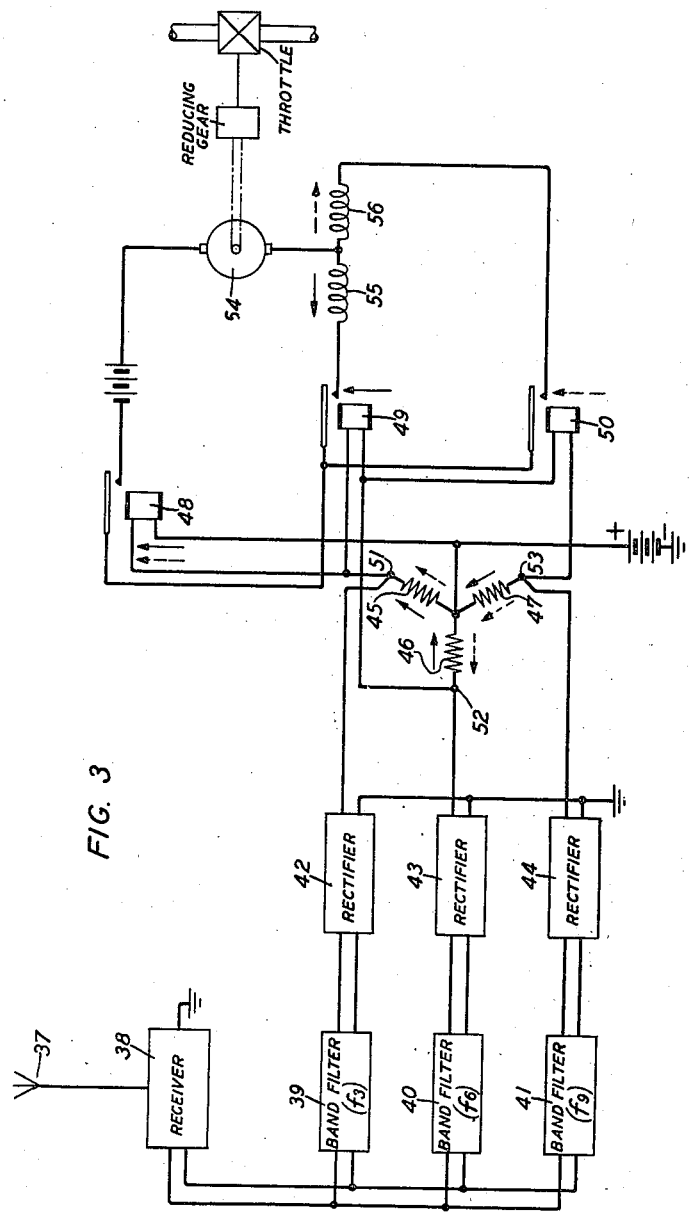
Fig. 3 shows a radio receiver and the associated equipment for controlling the speed of a moving craft.

It is well known in the art of wave transmission that if two waves of the same frequency are radiated simultaneously in space from opposing transmitting stations interference occurs between the two waves, with the result that a field of standing waves is established. In the copending application of G. C. Southworth, Serial No. 91,971 filed July 22, 1936, there is disclosed and described a method of establishing between two separated points a course for the navigation of aircraft by setting up in space a system of standing waves. From each of the opposing transmitting stations, located respectively near the ends of the course, signal waves of the same frequency or carrier waves modulated with one or more signal waves are transmitted by means of directive antennae. Where a carrier wave modulated by one or more signal waves is employed, the frequencies of the modulating waves at one transmitting station are equal to the frequencies of the respective modulating waves at the other station. The result of the interference between these waves transmitted from the opposing stations is to establish along the zone chosen as the course between the two stations a system of standing waves. If the interference, along this zone, between the waves transmitted from the opposing stations is complete, there is established along the zone a succession of maximum intensity points, fixed with relation to the earth, and a succession of fixed points of zero intensity. Since the frequencies of the waves sent from the opposing stations are equal, these successive maximum and minimum intensity points remain fixed with respect to the earth, giving the effect of a static or standing wave.

In the method disclosed herein advantage is taken of the effect which the frequencies of the component waves have upon the character of the wave resulting from the interference of the component waves in space. Whereas the resultant wave is stationary in space if the frequencies of the component waves are equal, we have found that by causing the frequencies of the component waves to differ, the resultant wave may be caused to move or creep in either direction and at any desired speed, and that this creeping wave or system of creeping waves may be usefully employed to control the movement of aircraft. By causing the frequency of the component wave transmitted from one station to exceed by a small amount the frequency of the wave transmitted from the other station, the resultant wave may be made to travel in either direction, according to which component wave has the greater frequency. By properly selecting the frequency difference, the resultant creeping wave may be 100 or 120 miles an hour, and a pilot navigating an airplane equipped with a suitable receiving set may position his craft on the wave at any desired point with respect to the maximum and minimum amplitudes. So long as the craft maintains the same speed as the moving wave, no change is experienced in the signal received. However, if the craft gains or loses speed with respect to the wave, the intensity of the wave received changes accordingly. The signal received on the aircraft may therefore be used to give the pilot a visual indication or it may be used to automatically control the speed of the airplane.

While the resultant creeping wave may be established by transmitting from the opposing stations a single unmodulated wave of desired frequency, better transmission results may be obtained by modulating a carrier wave with a wave of signal frequency and transmitting the modulated wave from each of the transmitting stations. Also, a more accurate control of the aircraft may be obtained by modulating the carrier wave with a plurality of signal waves, each of a different frequency, and transmitting the modulated wave from each of the sending stations. For example, the carrier wave may be modulated with three different signal waves, one of which has a given frequency, another of which is twice the frequency of the first and another of which is three times the frequency of the first. These two modulated carrier waves interfere in space to establish a system of creeping waves including therein the three signal wave components. Since these three signal wave components bear a different phase relation to each other, an airplane moving through space at the same speed as the movement of the three component waves maintains a fixed relation to each of said component waves.

A wave system of the character above described is illustrated in Fig. 1 of the drawings. This figure shows a system of creeping waves moving in space from right to left at a given velocity. There are three signal waves 3, 6 and 9 in the system. Wave 3 has a frequency $f_3$; wave 6 has a frequency $f_6$ which is twice the value of frequency $f_3$; and wave 9 has a frequency $f_9$ which is three times the value of frequency $f_3$. Consider that an airplane is located at one of the points 0 and is moving in the direction of the wave system and at the same speed. With this assumption, the amplitude of the signal wave 3 received by demodulating the modulating carrier is seen to be 0. Similarly, the amplitude of the detected signal wave 6 has a value about half the maximum amplitude of that wave. And the amplitude of the detected signal wave 9 is the maximum amplitude of the wave. If the speed of the airplane increases and it begins to lead the wave system, a signal is received from the wave 3, the amplitude of the signal received from wave 6 diminishes, and the amplitude of the signal received from the wave 9 also diminishes. However, if the airplane loses speed and begins to lag with respect to the wave system, the signal received from the wave 3 also assumes a finite value, the signal received from wave 6 increases, and the signal received from wave 9 again decreases. It will be shown hereinafter that these changes of amplitude in the signals received from the several components of the moving wave system may be used to control automatically the speed of the airplane.

An expression will now be developed to show that the wave resulting from the interference between two component waves transmitted in opposite directions may be made to creep at any desired speed in either direction.

The two component waves may be written as follows:

$$E_1 = A \cos \omega(1+\epsilon)\left(t - \frac{x}{v}\right) \quad (1)$$

$$E_2 = B \cos \omega(1-\epsilon)\left(t + \frac{x}{v}\right) \quad (2)$$

Where

A and B are the respective amplitudes of the two waves;

$\frac{\omega}{2\pi}$ = the frequency of the waves;

$+x$ and $-x$ represent distances, plus and minus, along the line of propagation;

$v$ = the velocity of propagation; and $\epsilon$ is a small value introduced to provide a small frequency difference between the two component waves traveling in opposite directions.

The relation of these two waves may be expressed $$E = (A+B) \cos \frac{\omega}{v}(x - \epsilon v t) \cdot \cos \omega\left(t - \frac{\epsilon x}{v}\right) +$$
$$(A-B) \sin \frac{\omega}{v}(x - \epsilon v t) \cdot \sin \omega\left(t - \frac{\epsilon x}{v}\right) \quad (3)$$

As the magnitude A approaches B, $$E \doteq 2A \cos \frac{\omega}{v}(x - \epsilon v t) \cos \omega t \quad (4)$$

This expression represents a wave traveling with a velocity $\epsilon v$ along the positive direction $x$ and having an amplitude approximately twice the amplitude of either one of the component waves. By making $\epsilon$ equal 0, the waves are at rest. It is also obvious that by giving $\epsilon$ a small negative value the system of standing waves may be made to creep in the negative direction. If $\epsilon$ is given a value of 1.5 $(10^{-7})$, the wave will travel at a speed of about 100 miles per hour.

Similar expressions could be developed for a creeping wave system resulting from the interference between carrier waves modulated with one or more waves of signal frequency.

A description will now be given of the equipment at the transmitting stations and of the equipment located on the moving airplane.

The two transmitting stations A and B, which are located near the extremities of the navigation course, are provided with equipment for transmitting directive waves of the required frequencies. At station A an oscillator 1 generates a wave of some suitable frequency $f_0$. The wave $f_0$ is multiplied by a frequency multiplier 2 to produce three separate waves of signal frequencies $f_3$, $f_6$ and $f_9$. While these waves may be of any desired frequencies, it is convenient that the waves $f_6$ and $f_9$ have frequencies, respectively, twice and three times the frequency of wave $f_3$. The signal wave $f_3$ is applied to a frequency multiplier 4 by way of the transmission line 3. The multiplier 4 produces a wave of some suitable high frequency $f_c$, which is used as the carrier for transmitting the signal waves. The carrier frequency wave $f_c$ is adjusted as to phase by a phase shifter 5, and applied to the modulator 6. A portion of the wave $f_3$ and waves $f_6$ and $f_9$ pass over the transmission circuits 7, 8 and 9 respectively to the phase shifting circuits 10, 11 and 12. After undergoing any necessary phase adjustment, the waves $f_3$, $f_6$ and $f_9$ are delivered over the line 13 to station B.

The oscillators 1 and 29 are connected to the modulator 14; the purpose of this is to furnish waves of frequency $(1+\epsilon)f_0$ which after selection by filter 15 are multiplied in the frequency multiplier 16 and supply signal waves having frequencies which differ from the frequencies $f_3$, $f_6$ and $f_9$ by a small, predetermined percentage. The waves thus produced are then delivered to the phase shifters 17, 18 and 19 and then to the modulator 6 for the purpose of modulating the carrier wave $f_c$. Assume, for example, that it is desired to increase the frequencies of waves $f_3$, $f_6$ and $f_9$ by a small factor $\epsilon$. To accomplish this, oscillator 29 may be designed to generate a wave having the frequency $(2+\epsilon)f_0$. Then there will be emerging from frequency multiplier 16 waves having frequencies, respectively $(1+\epsilon)f_3$, $(1+\epsilon)f_6$ and $(1+\epsilon)f_9$. It is assumed that the frequency multipliers have associated filters for selecting the desired frequencies. The modulator 6 modulates the carrier wave $f_c$ with each of these signal frequencies. The modulated wave is then amplified by a suitable amplifier 21 and is radiated by the antenna 22.

The waves $f_3$, $f_6$ and $f_9$ from the multiplier 2 after proper phase adjustment are transmitted over the line 13 to the station B. At station B the wave $f_3$ is selected by a filter 23 and is stepped up by a frequency multiplier 24 to give a high frequency wave of the carrier $f_c$. The carrier wave $f_c$ is delivered to the modulator 25. The waves $f_3$, $f_6$ and $f_9$ communicating over the transmission line 13 are also applied to the modulator 25 for the purpose of modulating carrier wave $f_c$. The modulated carrier wave is then amplified by amplifier 27 and applied to the antenna 28 for radiation.

Since the two carrier waves are transmitted from the stations A and B simultaneously and in opposite directions along the straight line connecting the two stations, and since the carrier wave at station A is modulated by signal waves having frequencies which exceed by a definite percentage the frequencies of the corresponding signal waves used to modulate the carrier at station B, the result is, as has been fully explained hereinbefore, that a system of creeping waves is established in space. In deriving expressions for these component waves it was assumed that the signal frequencies at the two stations A and B could be derived by adding a slight increment to a given value at one station and by subtracting the same increment from the given value at the other station. And, while the equipment illustrated herein is designed merely to increase the frequencies at station A, it will be obvious that a similar decrease in the frequencies could be performed at station B.

Consider now the equipment on the moving craft, such as an airplane. The receiving antenna 37 (Fig. 3) is connected to any suitable radio receiver 38. The output circuit of the receiver 38 is connected in multiple to filters 39, 40 and 41 designed to select, respectively, bands of frequencies containing frequencies in the neighborhood of $f_3$, $f_6$ and $f_9$. The waves of signal frequencies $f_3$, $f_6$ and $f_9$ after being detected in the receiver 38 and selected by the filters 39, 40 and 41 are applied to the respective rectifiers 42, 43 and 44. The output circuits of these rectifiers are connected as illustrated to the three resistances 45, 46 and 47. The resistances 45, 46 and 47 are also connected to the windings of relays 48, 49 and 50. These relays control the circuits for the armature 54 and field windings 55 and 56 of a differential motor. The armature of the motor is geared in a suitable way to the throttle of the airplane engine for the purpose of controlling the supply of fuel to the engine.

In order to better understand the operation of the control equipment associated with the receiving set, reference should be made to the wave diagram of Fig. 1. Assume that the airplane is flying along with the moving wave system and is positioned at one of the points 0 in said wave system. At the point 0 it will be seen that the signal wave $f_3$ has zero amplitude, that the signal wave $f_6$ has a value about one-half its maximum amplitude, and that the signal wave $f_9$ is at its maximum amplitude. An inspection of the circuits will show that under these conditions maximum signal current from rectifier 44 flows through the resistance 47 and medium current from rectifier 43 flows through the resistance 46. The polarity of the currents flowing in these two resistances, however, is such that none of the relays 48, 49 or 50 operates. Assume now that the craft gains in speed and begins to lead the wave system. This means that the signal received from the wave $f_3$ assumes an increasing finite value. Current now flows through the resistance 45 having a polarity indicated by the heavy arrow. The resultant difference of potential across the common central terminal of the resistances and the terminal 51 of resistance 45 causes a current to flow through the winding of relay 48, and the relay operates. Relay 48 closes one point in the armature and field circuit of the motor. Furthermore, the lead assumed by the craft causes a decrease to occur in the intensity of the signal received from the wave $f_6$. The effect of this decreased intensity of the wave $f_6$ is to make the outer terminal 52 of resistance 46 more positive. Furthermore, the lead assumed by the craft causes a reduction in the signal intensity received from the wave $f_9$. The effect of this reduction is to make the terminal 53 of resistance 47 more positive. The result of these changes is that terminal 52 is made positive with respect to terminal 51. Therefore current flows through the winding of the relay 49 and this relay attracts its armature. A circuit may now be traced from battery through the armature 54 and differential winding 55 of the motor, contacts of relays 49 and 50, to the opposite pole of the battery. The motor 54 is started and rotates in the proper direction for reducing the supply of fuel to the engine, thereby diminishing the speed of the craft.

Assume next that the craft loses speed and commences to lag the wave system. In this case an inspection of the chart in Fig. 1 will show that the intensity of wave 3 assumes an increasing finite value, the intensity of wave 6 increases, and the intensity of wave 9 decreases. The increase in the intensity of the signal from wave 3 produces a difference of potential across the resistance 45 having the same polarity as when the craft was leading. Accordingly, relay 48 operates as before. The increase in the signal from wave 6, however, makes the common terminal of the resistances more positive and the terminal 52 less positive. Similarly, the decrease in the signal from wave 9 makes the common terminal less positive and the terminal 53 more positive. The result of this is that terminal 53 becomes positive with respect to terminal 52 and current flows through the winding of relay 50. Since, however, both terminals 51 and 52 are negative with respect to the common terminal, no current flows through the winding of relay 49. Relay 50 operates and a circuit is now completed from battery, through the armature 54 and differential winding 56 of the motor, through the contacts of relays 50 and 48 to the other poles of the battery. The motor now rotates its armature in the opposite direction and increases the supply of fuel to the engine to increase the speed of the craft.

What is claimed is:

1. The method of controlling a moving object which comprises transmitting two opposing waves to establish an interference field in space, selecting different fixed frequencies for said waves to produce a resultant wave that moves at a given fixed velocity, and utilizing said moving wave to automatically govern the speed of said object.

2. The method of controlling a moving object which comprises transmitting two directively opposing waves to establish an interference field in space, selecting different fixed frequencies for said waves to produce a resultant wave that moves at a fixed velocity continuously in the same direction, substantially, and causing said moving wave to partly maintain the speed of the object at a definite value with respect to the velocity of said wave.

3. The method of controlling a moving object which comprises transmitting two waves in opposite directions along a given path to establish an interference field in space, selecting for said waves frequencies which differ a constant amount and in a sense to produce a resultant wave that moves in a predetermined direction at a predetermined speed, absorbing at said object energy from the resultant wave and automatically changing the speed of said object upon a change in the amount of energy being absorbed.

4. The method of controlling a moving object which comprises non-directively transmitting two sets of oppositely directed waves to establish two fields of interference in space, selecting for each set different fixed frequencies which differ from those in the other set whereby two resultant waves that move at a desired velocity are produced, and absorbing at and during the transit of said craft a constant amount of energy, substantially, from each of the moving waves.

5. A method of regulating the velocity of a mobile craft along a given path between two points which comprises non-directively transmitting from one point a plurality of radio waves having relatively widely different frequencies and from the other point a similar plurality of radio waves each of which differs by the same given small amount from one of the first-mentioned frequencies, whereby a plurality of creeping waves having a definite phase relation are propagated along said path at a velocity corresponding to said small given frequency difference and in only one direction, and absorbing at the craft a constant amount of energy, substantially, from each of said creeping waves during transit of said craft.

6. In a navigational system, an antenna located at each terminal of a given course or path, and means associated therewith for supplying waves of relatively widely different frequencies to each antenna, each frequency supplied to one antenna being different from one of the frequencies supplied to the other antenna by a given relatively small amount, whereby a plurality of creeping waves are propagated along said path.

7. In combination, a system in accordance with claim 6, a mobile craft, means thereat for receiving energies from each of said creeping waves, and means controlled by said energies for automatically regulating the speed of said craft.

GEORGE CLARK SOUTHWORTH.
FRENCH HOKE WILLIS.